INVENTOR
Eugene A. Stano

BY Duckworth & Hobby
ATTORNEYS

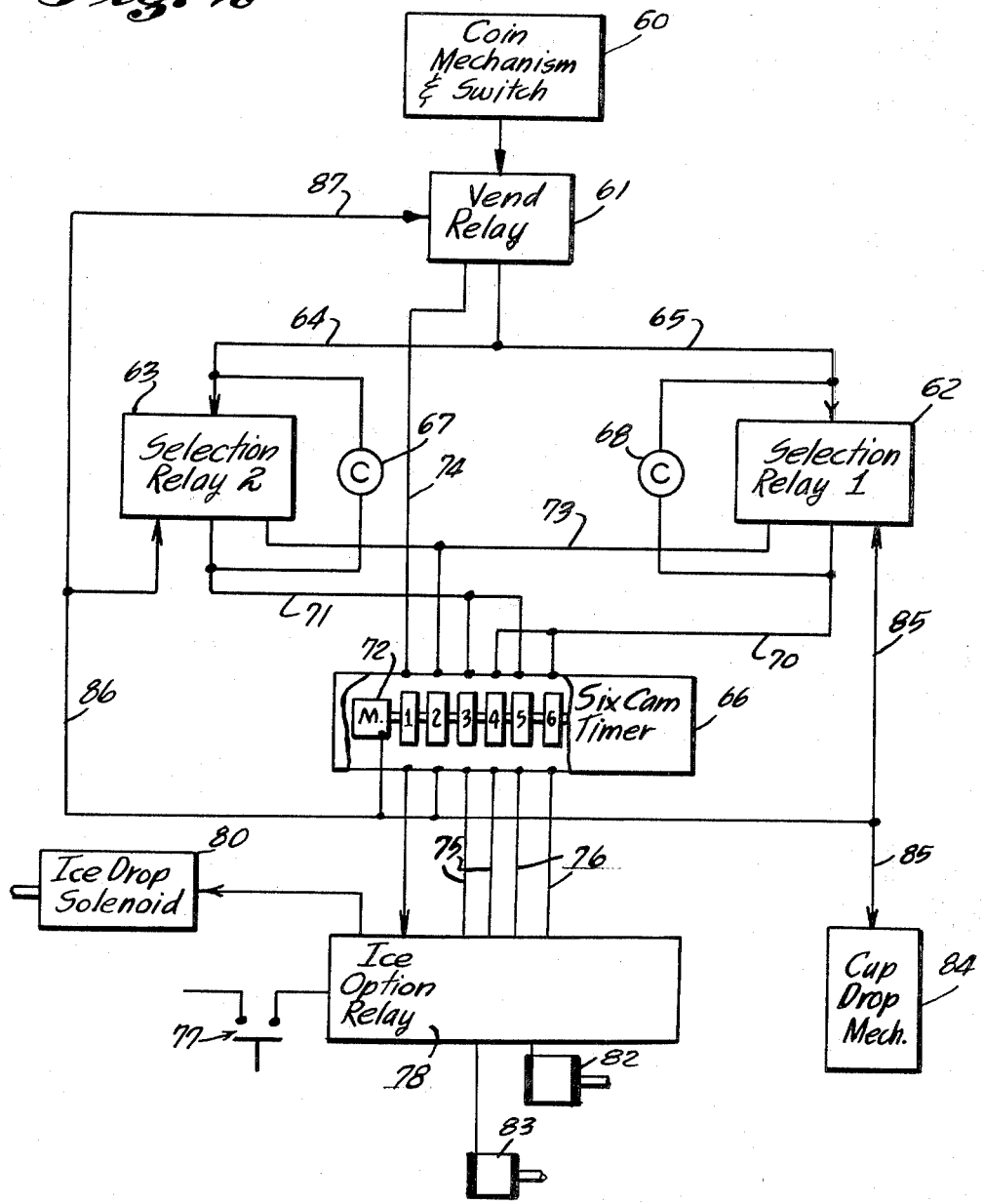

United States Patent Office 3,702,666
Patented Nov. 14, 1972

3,702,666
VENDING MACHINE
Eugene A. Stano, Orlando, Fla., assignor to Florida Juice Vendors, Inc., Orlando, Fla.
Continuation of abandoned application Ser. No. 800,517, Feb. 19, 1969. This application Apr. 7, 1971, Ser. No. 132,080
Int. Cl. B67d 5/56
U.S. Cl. 222—129.4                              4 Claims

ABSTRACT OF THE DISCLOSURE

A vending apparatus and method, especially adapted for use with concentrated ingredients such as concentrated orange juice, grapefruit juice or apple juice, uses ordinary tap water at regulated pressures and temperatures. Mixing valves operate by the flow of tap water mixing concentrated ingredients in predetermined proportions with the water and which valves are operated by solenoids, or the like, for predetermined time cycles, where cycles vary in accordance with the selections made on a selection panel following the insertion of a coin into the machine.

BACKGROUND OF THE INVENTION

This is a continuation of application Ser. No. 800,517, filed Feb. 19, 1969.

Field of the invention

The present invention relates to vending machines and in particular to those vending machines adapted to mix the ingredients in the machine after being coin activated, as distinguished from those vending machines that have the ingredients pre-mixed and from dispensers which are adapted for dispensing mixed beverages without regard to the automatic nature of the coin-operated machine. Coin-controlled selective drink vending machines of the present type generally mix together the essential ingredients of a beverage such as a syrup and a carbonated water. These machines frequently have provision for a receptacle such as a cup, which is automatically and simultaneously provided for receiving the beverage upon the insertion of a coin into the machine. A selection of beverages may be provided for any one of which is automatically mixed and dispensed. Other selections such as ice for cold beverages, or cream and sugar for coffee may be provided by these machines which may have their own refrigeration systems, ice-making machines, and the like.

Description of the prior art

In the past there have been many types of coin-operated beverage vending machines. These prior art vending machines have included those that have a beverage prepared before it is supplied to the apparatus and thus require no mixing operation therein. This type of machine may have beverages pre-bottled or canned for delivery upon insertion of the proper coin. This type of apparatus is distinguished from the present invention since no automatic mixing of the beverage in the machine is required and thus the problems involved are much simpler as is the resulting vending machine.

Another type of prior art apparatus provides for mixing the beverage in the machine automatically upon the insertion of a coin and usually upon the making of a selection. This type of machine has additional problems, such as automatically providing cups for the beverage once mixed and means for making and delivering ice to the cup or in the case of hot drinks, of heating the ingredients, and in the case of machines for carbonated drinks, the additional problems of automatic preparation of carbonated water for the drink. In a vending machine, there is also a space problem, as it is necessary to maintain the machine at a reasonable size for placement in commercial establishments and the like, so that in a limited space provided, there must be room for holding the various concentrated syrups, mixing the syrup with water or carbonated water, or the like, and means for supplying the correct amount of mix materials. There must also be provided space for holding receptacles or cups, together with means for dispensing these cups and then dispensing the beverage into the cup, refrigeration and ice-making equipment and means for delivery of predetermined amounts of ice into the cup, where that option is selected, and to deliver a smaller amount of beverage to compensate for the space taken up by the ice in the cup. Each of these operations must be adapted for automatic operation only after insertion of the proper coin into a coin mechanism which in turn must provide safeguards against the acceptance of fake coins and for delivery of the proper change for different size coins. As will be clear, the problems of post-mixed vending machines become relatively complex and expensive to build and maintain, and also to service.

One of the problems involved in these types of vending machines is the source pressure used in actuating and mixing part of the apparatus. Many of the prior art vending machines are actuated by gas pressure from a carbon dioxide cylinder while some are gravity supplied and others depend upon water pressure from the water supply. Still others depend upon various means such as weights, electric motors, pumps and hand-operated pumping systems which are operated with each drink by the operator himself. Each of these types of power supply have advantages and disadvantages but all have been used with some degree of success. One specific type of invention in the past has been directed to a dispenser for mixed chocolate drinks in which chocolate syrup concentrate may be mixed with either hot or cold water in pre-determined proportions and which utilizes ordinary tap water at a controlled pressure and which mixes the water automatically with the chocolate syrup in a pre-determined proportion provided by the flow of the water through the mixing valve.

Another type of dispensing apparatus depends upon gravity flow of flavored syrup from an elevated storage tank for holding the concentrated syrup in which carbonated or non-carbonated water passes through at a lower level after being cooled in a cooling device. This type of apparatus is adapted for use on counter-top type of mixing dispensers in soda fountains and the like. These latter two devices are fairly simple in that they are dispensing machines rather than vending machines; that is to say, they are adapted for dispensing a mixed beverage by an operator and do not get into the complexities of coin-operated devices where the mixing amount, cups, and the like, are all done automatically, and are mentioned here only because one of the major requirements in both dispensing and vending apparatuses in which the beverage is mixed at the location of consumption is at an accurately pre-determined ratio of flavoring syrup to water be maintained at each serving to thereby consistently maintain the desired quality in the drink while avoiding over-flavoring and the consequent increase in cost of the serving, and because these latter devices provide similarity in the means for accurately mixing the syrup and the water in the desired proportions.

SUMMARY OF THE INVENTION

The present invention relates to a coin-operated vending machine and more particularly to a vending machine especially adapted for use with concentrated syrups such as concentrated orange juice, concentrated grapefruit juice, concentrated apple juice, and the like. The present vending machine is provided with a coin mechanism, refrigeration, and ice-making devices as well as ice, and cup-dispensing means including means for rotation to another stack of cups when one is depleted.

The present vending machine has a ventura type mixing valve which utilized the flow of cold water to draw a concentrated ingredient into admixture with the cold water in pre-determined proportions. A solenoid valve control allows water to pass through the mixing valve, and a timing control means activates the solenoid valve for a predetermined period of time or times cycle to fill a cup and in the event an ice option is selected, to fill the remainder of the cup after the ice is added. In addition to this ice option, selections are also provided for different types of beverages. Additional features of the present vending machine provide for filtration of the incoming water and means for regulating the pressure of the incoming water, as well as safety valves, temperature controls and the like.

BRIEF DESCRIPTION OF THE DRAWINGS

Other objects, features and advantages of this invention will be apparent from a study of the written description and the drawings in which:

FIG. 2 is a block diagram of one embodiment of the control electronics for the embodiment of FIG. 1.

DESCRIPTION OF THE PREFERRED EMBODIMENT

Figure 1:
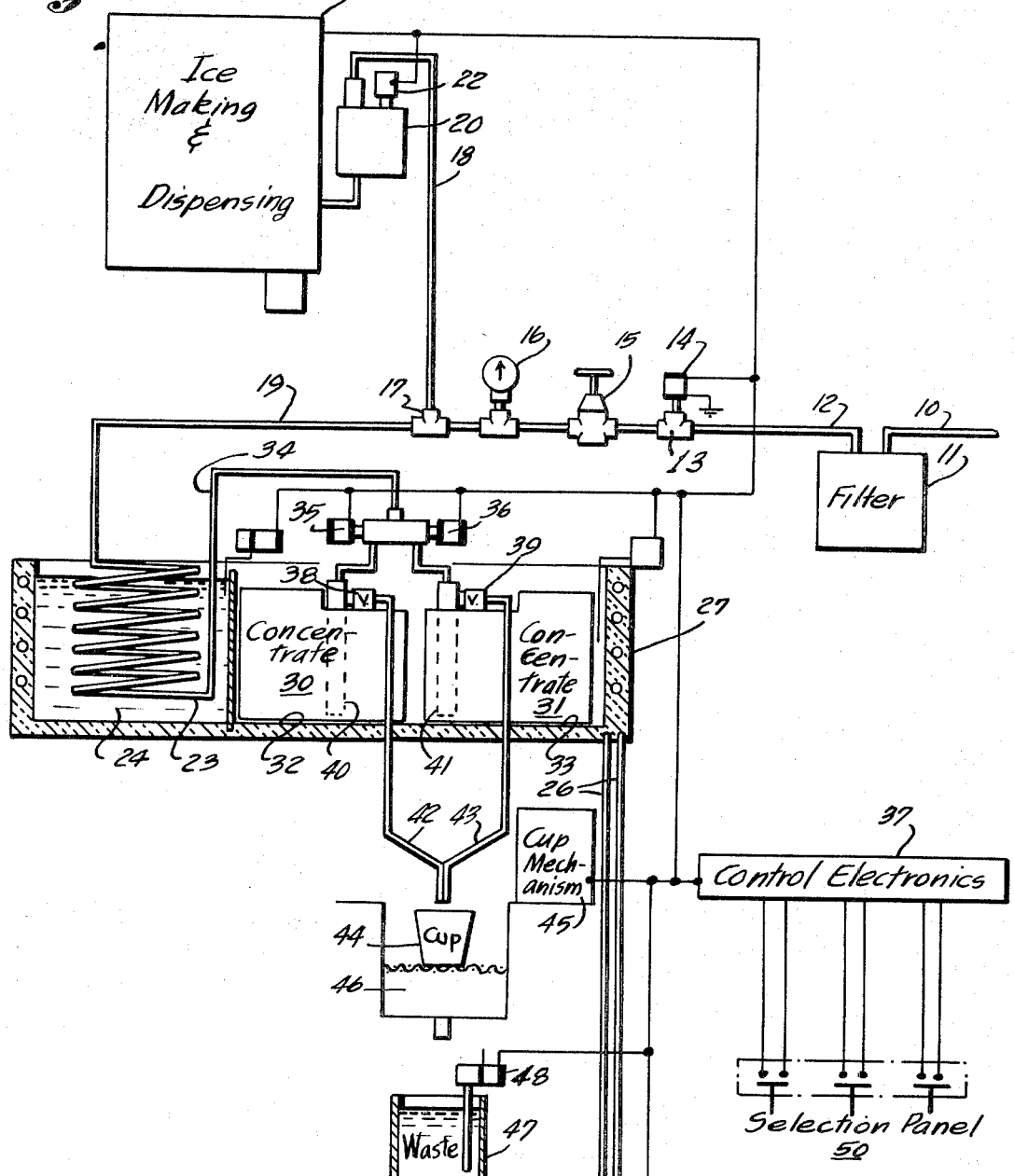
FIG. 1 is a diagrammatic showing of a preferred embodiment of the present invention, and illustrating generally a flow diagram of the mixing apparatus.

Referring now to FIG. 1, a simplified flow diagram of a preferred embodiment of the present invention may be seen having an input 10 from a main water line such as the municipal water supply which is fed into a filter 11 for filtering out certain minerals as well as impurities in the water. Filter 11 is essential for use with certain types of beverages since some minerals tend to vary flavor of reconstituted juices. This is because people's tastes have been conditioned by the use of fresh juices, such as orange juice, which have not been concentrated and do not have the similar minerals therein. The water leaves a filter through pipe 12, and passes through the solenoid valve 13 operated by solenoid 14 which is connected to the main power source of the machine so that in an emergency, such as may be caused by certain types of breakdowns, unplugging or disconnecting the vending machine will close the valve 13 by shutting off solenoid 14 and thus prevent any additional water entering the vending machine. The entering water next passes through a water pressure regulator which regulates the water pressure of the entering water and maintains its pressure at constant level. This is important since the mixing in the present machine depends upon the time flow of water at a pre-determined pressure and too much variation of that pressure will result in excessive variations in the mixing of the concentrate. A water pressure gauge 16 is provided to determine the pressure of the water after passing the water pressure regulator 15. The water then passes through a T-joint 17 which provides water for pipes 18 and 19. Pipe 18 leads into a water storage tank 20 for an ice making and dispensing machine 21 and has a water level switch 22 to determine when to allow more water to enter the water storage tank 20. The ice machine manufactures ice from the water in storage tank 20 and also is adapted to dispense it into a cup when an ice option selection is taken as will be described in more detail later. The water in pipe 19 passes through a water cooling coil 23 where the water is cooled by a coolant liquid 24, which may be water. Water 24 is cooled by refrigeration unit 25 having refrigerant lines 26 leading into a heat exchanger 27 which keeps water 24 cool, and also cools concentrates 30 and 31 located in concentrate holding tanks 32 and 33 respectively. The concentrates are kept cool to prevent spoilage, in addition to the benefit of having cooled concentrates mixed with cool water for a cool drink. The entering water leaves cooling coils 23 throughpipe 34 and enters solenoid valves 35 and 36. These valves are controlled by the control electronics 37 and are operated for a predetermined period of time to allow a predetermined volume of tap water to pass therethrough. Whether solenoid 35 or 36 is operated and for how long depends upon the selection made by the person operating the machine and also by whether the ice option selection is made. It will of course be clear that the solenoid valves must operate for a lesser period of time when the ice option is selected, since the ice will fill a portion of the cup. The water passes from the solenoid valve 35 or 36 to either of ventura mixing valves 38 or 39 respectively which draws concentrate out of either concentrate storage tank 32 or 33 and mixes it with the tap water passing through. A portion 40 of valve 38 may be seen extended down into concentrate 30 for withdrawing the concentrate from storage tank 32 and similarly, a portion 41 of mixing valve 39 may be seen extending into concentrate 31 and storage tank 33 for withdrawing the concentrate therefrom. The mixed beverage leaves mixing valve 38 through nozzle 42 and the mixed beverage leaves mixing valve 39 through nozzle 43 and in either case will be dropped into a cup 44 which has been dispensed by cup mechanism 45, which is also operated by the control electronics 37. Waste or overflow beverage from the cup is adapted to drain out of a cup holding stand 46 into a waste bucket 47 which has an overflow switch and valve 48 operated by control electronics 37 and adapted to remove waste from waste bucket 47 when it reaches a pre-determined point. A selection panel 50 is shown having three selections, two being selections of the type of beverage desired and one being an ice option selection which is pushed when ice is desired and not pushed if ice is not desired. As will be clear in the description of FIG. 2, selections cannot be made on selection panel 50 until the coin has been presented to the coin mechanism and determined to be genuine.

Turning now to FIG. 2, there is shown a simplified block diagram of one embodiment of the electronics 37 which may be used to operate the vending machine of the embodiment of FIG. 1. A coin mechanism and relay switch 60 is provided and which may be a standard coin mechanism which may be purchased as a unit, and which is adapted to reject fake coins and also to hold a coin of too large a denomination while providing change. The coin mechanism also actuates a vend relay 61 which relay is maintained in an operating position until reset, as will be described later. Operation of the vend relay 61 applies a voltage to selection relays 62 and 63, as illustrated by lines 64 and 65. Selection relay 62 or selection relay 63 is selected by the person purchasing a drink. This in turn allows the voltage applied by vend relay 61 to be applied to a six cam timer 66 and will also be counted by either counter 67 or 68 which counts each selection made. Selection relay 62 through line 70 applies the voltage to timing cams 4 and 6 of the six cam timer 66, while selection relay 63 through line 71 applies a voltage to timing cams 3 and 4 of the six cam timer 66. A motor 72 operates six cam timer 66, and selection relays 62 and 63 also supply voltage to timing cam 2 of six cam timer 66, while vending relay 61 through line 74 applies a voltage to timing cam #1. The voltage applied from selection relay 62 as well as the voltage supplied from relay 63 will place a voltage on lines 75 and 76. However, the length of time that the voltage is placed on lines 75 and 76 depends upon which of the timing cams of six cam timer 66 the voltage is passing through, while the motor 72 is rotating the six cam timer one revolution or one timing cycle, which in turn depends upon which selection relay is taken. Thus, it can be seen that different selections may supply different amounts of beverage and also will supply different amounts depending upon whether an ice option relay is selected. The switch 77 activates an ice option relay 78 which has voltage supplied from cam

1 of six cam timer 66 and which in turn activates ice drop solenoid 80 for dropping a predetermined amount of ice into a cup. Ice option relay also activates a double pole-double throw relay to activate solenoid 82 and solenoid 83 for a shortened cycle. One position of course being when ice is selected and the other when ice is not selected. The cams 3 through 6 of six cam timer 66 time the length of time the solenoid 82 or 83, depending upon the selection, will operate depending upon whether ice is selected or is not selected. Solenoids 82 and 83 will of course be recognized to be timed solenoids 35 and 36 of FIG. 1 which form a part of the overall mixing of the beverage by allowing a pre-determined amount of water to pass therethrough and through their respective mixing valves. Timing cam #2 of six cam timer 66 operates the cup drop mechanism 84 through line 85 and also operates to reset selection relay 62 or 63 through line 85 or 86 respectively, depending upon which relay has been activated by the selection that has been made. This timer also acts to reset vending relay 61 through line 87 and thus the machine is prepared for accepting another coin for another selection.

As can be seen, a simplified block diagram of the operation of the present system has been illustrated and it will be clear to those skilled in the art that the major components are commercially available items adapted for the present invention. For instance, coin mechanisms such as shown in block 60 are commercially available as entire units, as is cam timing unit 66 and various types of relays and solenoids so that they can readily be purchased.

It should also be realized at this point that while the basic vending machine has been here described along with its operation, that it is also anticipated that items such as panel lights for advertising panels, lights to indicate when the machine is sold out of particular selection, lights in the machine for servicing or making repairs, and the like, have not been illustrated, but are contemplated as being within the scope and spirit of the present invention.

It should also be realized that mixing valves 38 and 39 are of the type sometimes referred to as venturi or aspirator valves or pumps which are adapted to use the flow of water to draw out the concentrated syrup by the pressure created in the venturi of a noozle which then mixes the concentrate with the water in predetermined portions and usually with provisions for adjusting the proportion of concentrate to water. This type of mixing valve is commercially available in many types and sizes depending upon the particular use to which it is to be put.

At this point it can be seen that the control electronics are activated by coin mechanism 60 which operates a vend relay 61 which applies voltage to selection relays. An ice option relay is next selected which provides ice to the cup dispensed from cup dropping mechanism 84. Next a selection relay selecting a particular drink is selected which in turn applies voltage to two separate cams each with a different timing cycle. These in turn will apply a voltage over a predetermined length of time to lines 75 and 76. However, since ice option relay has provided a completed circuit for only one of these lines 75 and 76, only one solenoid 82 or 83 will be activated and only for the one cam timing cycle that has been activated for that line. Thus a pre-determined selected concentrate will be selected to operate for a pre-determined time to allow a pre-determined amount of water to pass through a valve, which in turn draws out a pre-determined ratio or proportion of concentrate for mixing therewith. This particular selection will also have two timing cycles— one when ice is desired, therefore requiring a small amount of beverage, and the other when ice is not desired, requiring an additional amount of beverage to fill a cup.

This invention is not to be construed as limited to the particular form disclosed herein, since these are to be regarded as illustrative rather than restrictive.

I claim:
1. A vending machine and control apparatus comprising in combination:
 (a) a vending relay;
 (b) a coin actuated switch connected to said vending relay for actuation thereof;
 (c) a plurality of selection relays connected to said vending relay;
 (d) a motor driven cam timer means having a plurality of cam operated switches, said motor driven cam timer means being connected to each said selection relay, said motor being actuated by actuation of any one of said plurality of selection relays when said vending relay is operative and being deactivated upon completion of one cycle by one of said cam operated switches;
 (e) venturi mixing means adapted to mix a concentrate syrup with water passing therethorugh in a predetermined ratio of syrup to water, said mixing means being connected to an input water line;
 (f) solenoid valve means connected to said motor driven cam timer means and adapted for opening said input water line for a predetermined length of time determined by one said cam switch thereby delivering a preselected post mixed drink of predetermined strength;
 (g) ice option relay connected to said motor driven cam timer and also to an ice drop solenoid for actuation thereof upon switching an ice option selection switch for dropping ice into a cup; and
 (h) each said selection relay being connected to two separate cam switches, one of said cam switches determining the length of time said solenoid valve means is actuated when said ice option relay has been actuated, and the other said cam switch determining the length of time said solenoid valve means is actuated when said ice option relay is not actuated.

2. The apparatus in accordance with claim 1 in which a cup drop mechanism is actuated by the said motor driven cam timer upon actuation of one of said selection relays to drop a cup for receiving said post mixed drink.

3. The apparatus in accordance with claim 2 in which said selection relays each have a counter connected thereto for determining the number of times each selection relay is actuated.

4. The apparatus according to claim 3 in which said motor operated cam timer resets said vending relay, one said selection relay, said cup drop relay and said ice option relay upon completion of each cycle of said motor driven cam timer.

References Cited
UNITED STATES PATENTS

| | | | |
|---|---|---|---|
| 2,754,999 | 7/1956 | Bauerlein | 222—193 X |
| 2,776,074 | 1/1957 | St. Laurence | 194—13 |
| 3,164,299 | 1/1965 | Kenney | 222—129.4 X |

SAMUEL F. COLEMAN, Primary Examiner

U.S. Cl. X.R.
194—13; 221—96